(12) United States Patent
Hirama

(10) Patent No.: US 9,133,964 B2
(45) Date of Patent: Sep. 15, 2015

(54) VIBRATION-PROOF CLAMP

(71) Applicant: NIFCO INC., Yokohama-shi, Kanagawa (JP)

(72) Inventor: Taku Hirama, Utsunomiya (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/353,424

(22) PCT Filed: Oct. 18, 2012

(86) PCT No.: PCT/JP2012/076996
§ 371 (c)(1),
(2) Date: Apr. 22, 2014

(87) PCT Pub. No.: WO2013/061862
PCT Pub. Date: May 2, 2013

(65) Prior Publication Data
US 2014/0259565 A1    Sep. 18, 2014

(30) Foreign Application Priority Data

Oct. 28, 2011    (JP) ................ 2011-237735

(51) Int. Cl.
*F16L 3/02*    (2006.01)
*F16L 3/223*   (2006.01)
(Continued)

(52) U.S. Cl.
CPC . *F16L 3/223* (2013.01); *F16B 2/02* (2013.01); *F16L 55/035* (2013.01); *F16B 21/02* (2013.01); *F16F 1/3732* (2013.01); *Y10T 24/44* (2015.01)

(58) Field of Classification Search
CPC ............. F16L 3/00; F16L 3/02; F16L 3/08; F16L 3/10; F16L 3/1033; F16L 3/1041; F16L 3/1058; F16L 3/22; F16L 3/223; F16L 3/227; F16L 55/035; F16B 2/02; F16F 1/3732; Y10T 24/44
USPC ............ 248/681, 49, 65, 68.1, 73, 74.2, 74.5, 248/71; 24/455
See application file for complete search history.

(56) References Cited

U.S. PATENT DOCUMENTS 4,506,419 A    3/1985 Mitomi
5,190,251 A *  3/1993 Bodo ............................. 248/73
(Continued)

FOREIGN PATENT DOCUMENTS

CN    1475689 A    2/2004
CN    1524169 A    8/2004
(Continued)

OTHER PUBLICATIONS

PCT, International Search Report for PCT/JP2012/076996, Nov. 2012.
(Continued)

*Primary Examiner* — Anita M King
(74) *Attorney, Agent, or Firm* — Manabu Kanesaka

(57) ABSTRACT

A vibration-proof clamp includes a clamp main body with a holding portion for holding a pipe material, and having a mounting hole therein; a vibration-proof member mounted in the mounting hole, and having therein a fitting hole with a hole shaft corresponding to the mounting hole, and a concave groove provided by notching a peripheral edge of the fitting hole; and a clip including a cylindrical neck portion inserted into the fitting hole, a fixation rib inserted through the concave groove, and an elastic claw projected on an outer peripheral face of the neck portion and retractable inward in a radial direction. The neck portion is inserted into the fitting hole, the elastic claw retracts in a radial direction, and the fixation rib passes through the concave groove, then, the clip is relatively rotated relative to the vibration-proof member, so that the elastic claw fits into the concave groove.

6 Claims, 4 Drawing Sheets

(51) Int. Cl.
*F16B 2/02* (2006.01)
*F16L 55/035* (2006.01)
*F16B 21/02* (2006.01)
*F16F 1/373* (2006.01)

(56) References Cited

U.S. PATENT DOCUMENTS

| | | | | |
|---|---|---|---|---|
| 5,271,588 | A * | 12/1993 | Doyle | 248/68.1 |
| 5,947,426 | A * | 9/1999 | Kraus | 248/74.2 |
| 6,241,198 | B1 * | 6/2001 | Maruyama | 248/49 |
| 6,290,201 | B1 * | 9/2001 | Kanie et al. | 248/636 |
| 6,612,795 | B2 * | 9/2003 | Kirchen | 411/508 |
| 6,915,990 | B2 * | 7/2005 | Maruyama | 248/68.1 |
| 8,047,475 | B2 * | 11/2011 | Fukumoto et al. | 248/73 |
| 8,668,174 | B2 * | 3/2014 | Kato | 248/74.2 |
| 9,038,970 | B2 * | 5/2015 | Kataoka et al. | 248/74.1 |
| 2003/0136884 | A1 * | 7/2003 | Miura | 248/68.1 |
| 2003/0213876 | A1 | 11/2003 | Takeuchi | |
| 2004/0065785 | A1 * | 4/2004 | Miura et al. | 248/62 |
| 2006/0249634 | A1 * | 11/2006 | Van Walraven | 248/71 |
| 2007/0284485 | A1 * | 12/2007 | Kato | 248/68.1 |
| 2009/0256032 | A1 * | 10/2009 | Takenaka et al. | 248/68.1 |
| 2013/0320182 | A1 * | 12/2013 | Kataoka et al. | 248/562 |

FOREIGN PATENT DOCUMENTS

| | | |
|---|---|---|
| EP | 2290277 A2 | 3/2011 |
| JP | H06-008323 U | 3/1994 |
| JP | 2006-226394 A | 8/2006 |
| JP | 2009-115148 A | 5/2009 |
| WO | 0133128 A1 | 5/2001 |

OTHER PUBLICATIONS

China Patent Office, "Office Action for CN201280052445.3," May 6, 2015.

Europe Patent Office, "Search Report for EP 12843153.3," Jun. 29, 2015.

* cited by examiner

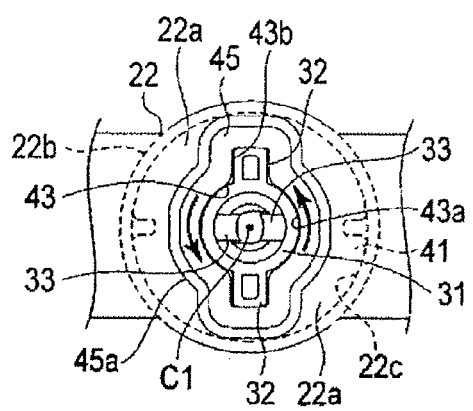
Fig. 4-1
(Second Process)
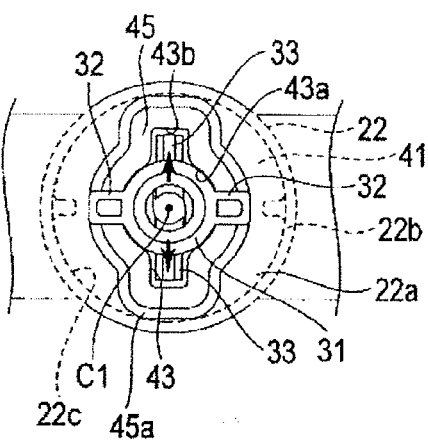
Fig. 4-2
(Third Process)
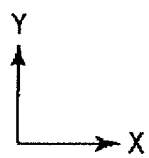

VIBRATION-PROOF CLAMP

FIELD OF TECHNOLOGY

The present invention relates to a vibration-proof clamp holding a pipe material and attached to an attachment object.

BACKGROUND ART

For example, in an automobile and the like, there is used a clamp attaching a pipe (pipe material) for an air-conditioner or for a fuel to a vehicle body. The clamp is formed by assembling a clamp main body holding the pipe, and a clip locked in the attachment object through an elastic member. For example, in the clip, there is provided a T-shaped rib, and long holes are formed in the clamp main body and the elastic member. The long hole of the clamp main body and the long hole of the elastic member are overlapped, and the T-shaped rib of the clip is inserted into the long holes and is rotated after being inserted, so that the clip and the clamp are fixed through the elastic member as a retainer of the rib of the clip.

PRIOR ART DOCUMENT

Patent Document

Patent Document 1: Japanese Unexamined Patent Publication No. 2006-226394

SUMMARY OF THE INVENTION

Problems to be Solved by the Invention

This kind of clamp is required to improve simplification of an assembly operation and a fixation ability in an assembly state.

Means for Solving the Problems

A vibration-proof clamp according to the present invention comprises a clamp main body provided with a holding portion by which a pipe material is held, and having a mounting hole formed therein; a vibration-proof member mounted in the mounting hole, and having therein a fitting hole whose hole shaft is coaxial with the mounting hole, and a concave groove provided by notching a peripheral edge of the fitting hole; and a clip including a cylindrical neck portion which can be inserted into the fitting hole, a fixation rib which can be inserted through the concave groove, and an elastic claw projected on an outer peripheral face of the neck portion and formed to be retractable inward in a radial direction. The neck portion is inserted into the fitting hole, the elastic claw retracts in a radial direction, and the fixation rib passes through the concave groove. Then, the clip is relatively rotated relative to the vibration-proof member, so that the elastic claw fits into the concave groove.

Effect of the Invention

The present invention can improve the simplification of the assembly operation and the fixation ability in the assembly state.

BRIEF DESCRIPTION OF THE DRAWINGS

FIGS. 3-1 to 3-3 are explanatory views showing an assembly process of the clamp according to the same embodiment.

FIGS. 4-1 to 4-2 are explanatory views showing the assembly process of the clamp according to the same embodiment.

BEST MODES OF CARRYING OUT THE INVENTION

Hereinafter, a clamp 10 (a vibration-proof clamp) according to one embodiment of the present invention will be explained with reference to FIG. 1 to FIG. 4-2. Arrows X, Y, and Z in each drawing respectively show three directions orthogonal to each other. Each drawing shows a structure by arbitrarily enlarging, reducing, or omitting for the sake of explanation.

Figure 1:
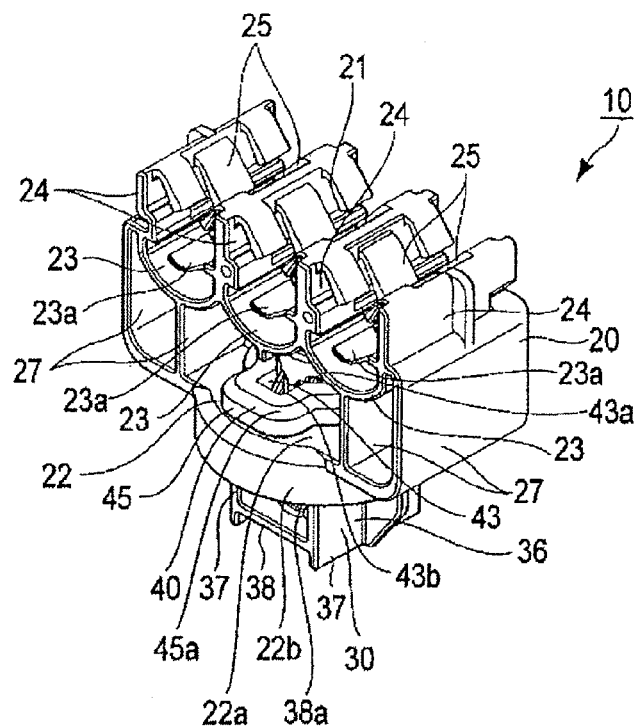
FIG. 1 is a perspective view showing a clamp according to one embodiment of the present invention.
Figure 2:
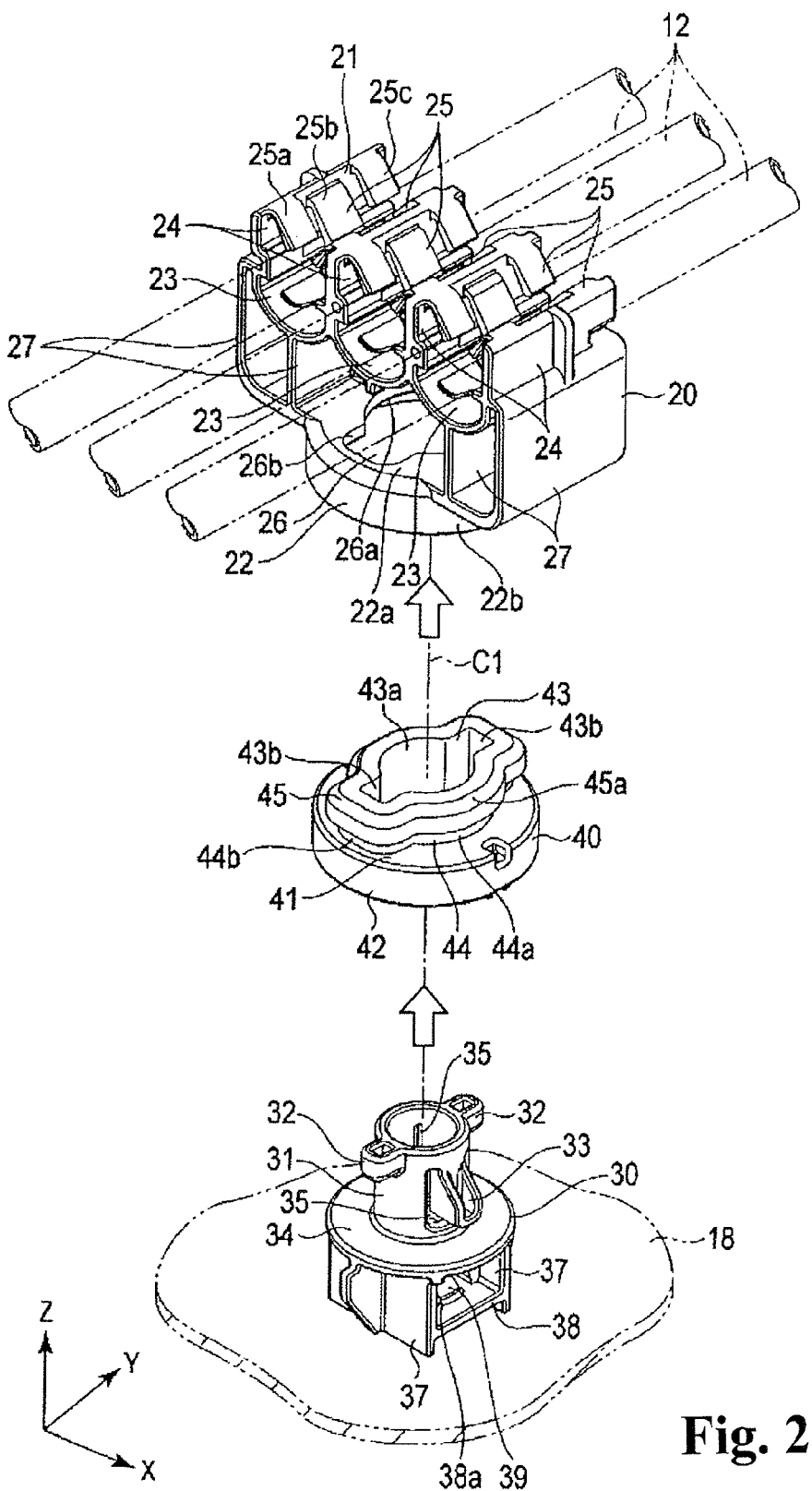
FIG. 2 is an exploded perspective view showing the clamp according to the same embodiment.
Figure 3:
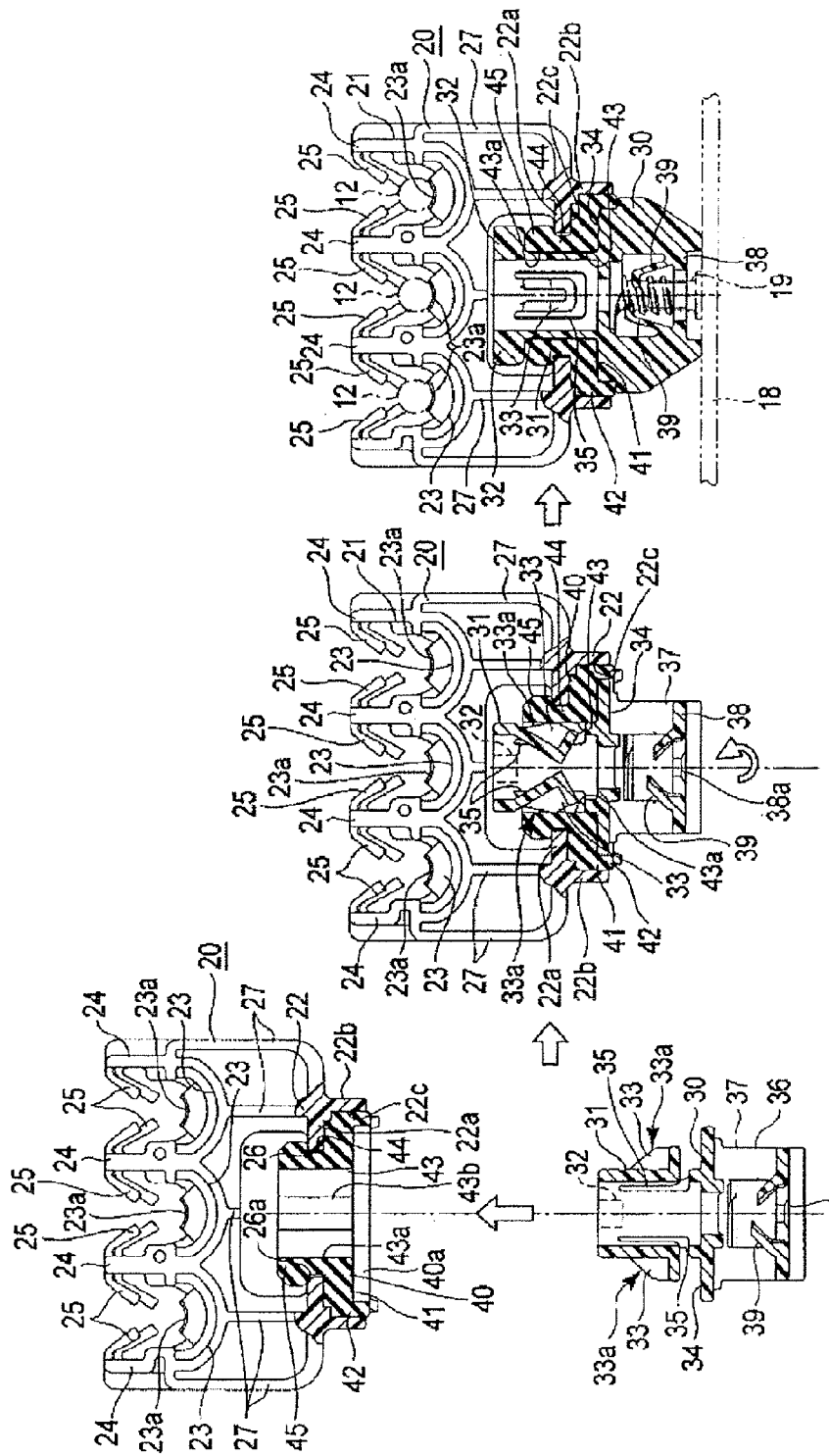

FIG. 1 is a perspective view of the clamp 10, and FIG. 2 is an exploded perspective view. FIG. 3-1 to FIG. 4-2 are explanatory views showing an assembly process, wherein FIGS. 3-1 to 3-3 show a mounting portion part in a cross-sectional view, and FIGS. 4-1 to 4-2 are plan views of a mounting portion 22.

As shown in FIG. 1 and FIG. 2, the clamp 10 comprises a clamp main body 20 holding various types of pipes; a clip 30 locked in an attachment object; and a vibration-proof member 40 (an elastic member) disposed between the clamp main body 20 and the clip 30.

The clamp 10 is fixed to the attachment object such as, for example, a body panel 18 of an automobile and the like in a state of holding various types of pipes 12 as a pipe material used for a fuel, for an air-conditioner, and the like, so that the various types of pipes 12 is fixed to the attachment object.

The clamp main body 20 is made of, for example, a synthetic resin material, and is a resin molded article integrally comprising a holding portion 21 holding the pipes 12, and the mounting portion 22 in which the vibration-proof member 40 is mounted.

In the holding portion 21, there is provided a plurality of arc-like holding bases 23 supporting the pipes 12 in parallel. In the holding base 23, there is formed a holding piece 23a having an arc face along an outline of the respective pipe. In both ends of the holding base 23, there are respectively provided support walls 24 to stand, and from an end portion of the support wall 24, there extends a pair of guide portions 25 elastically and deformably toward a center portion of the holding base 23. The guide portion 25 includes three pieces of guide pieces 25a, 25b, and 25c lining up in a shaft direction of the pipe 12, and the guide piece 25b in the center is disposed to protrude inward more than the guide pieces 25a and 25c on both sides.

A separate distance of the pair of guide portions 25 is shorter than a diameter of the pipe 12. When the pipe 12 passes between the facing guide portions 25, the guide portions 25 bend so as to allow the pipe 12 to pass through. Also, the maximum separate distance between an end of the guide portion 25 and the holding piece 23a is approximately the same as the diameter of the pipe 12. Consequently, when the pipe 12 is held in the holding base 23, the guide portion 25 restores to an original state, so that the pipe 12 is reliably held in the holding portion 21. On an outer peripheral face side of the holding base 23, there is provided a plurality of ribs 27 to stand, and through the ribs 27, the holding portion 21 and the mounting portion 22 are integrally formed.

The mounting portion 22 includes a discoid mounting wall portion 22a around a shaft center C1 along a Z direction in the drawings; and a peripheral wall portion 22b integrally formed on an outer periphery of the mounting wall portion 22a. Also, there is formed a housing portion 22c (shown in FIGS. 4-1 and 4-2) concaved in a circular shape on a rear side in which a disc portion 41 of the vibration-proof member 40 is housed. In an assembly state, the disc portion 41 of the vibration-proof member 40 is housed in the housing portion 22c.

A mounting hole 26 penetrates in a center portion of the mounting wall portion 22a. The mounting hole 26 is formed in a predetermined shape including a circular hole portion 26a around the shaft center C1 into which a circular portion 44a of a boss 44 and a neck portion 31 of the clip 30 are inserted; and a pair of groove portions 26b formed to be concaved outward from the circular hole portion 26a. The pair of groove portions 26b is disposed with a phase difference of 180 degrees to face each other.

The vibration-proof member 40 is a resin molded article formed by an elastic material including, for example, a rubber material, and is formed to be elastically deformable. Also, the vibration-proof member 40 includes the disc portion 41 (a second flange portion) having a shape same as that of the mounting portion 22, and there is integrally formed an annular skirt portion 42 drooping from an outer edge of the disc portion 41. On a rear side of the vibration-proof member 40, there is formed a circular concave portion 40a (shown in FIGS. 3-1 to 3-3) surrounded by the disc portion 41 and the skirt portion 42, and in the assembly state, a collar portion 34 is housed in the concave portion 40a.

In a center portion of the disc portion 41, there is formed the boss 44 in which a long hole 43 is provided in a center portion. The boss 44 includes the circular portion 44a having a circular shape, and a pair of projecting portions 44b, and an outer edge of the boss 44 is formed in the same shape with a diameter approximately same as that of an inner edge of the mounting hole 26 of the mounting portion 22 to be inwardly fittable in the mounting hole 26. In an end portion of the boss 44, there is formed a flange edge 45 protruding outward along an outline shape of the boss 44. An outer peripheral edge 45a of an end of the flange edge 45 is formed in a tapered shape, and forms an inclination face relative to a shaft center direction.

The long hole 43 is formed in a predetermined shape including a circular fitting hole 43a around the shaft center C1; and a pair of concave grooves 43b wherein an outer periphery of the fitting hole 43a is formed to be concaved outward. The pair of concave grooves 43b is disposed with a phase difference of 180 degrees to face each other. At an assembly operation time, the neck portion 31 can be inserted into the fitting hole 43a of the long hole 43, and a pair of fixation ribs 32 is formed to be insertable through the pair of concave grooves 43b.

When the flange edge 45 is pressed into the mounting hole 26 of the mounting portion 22, and the boss 44 is fitted into the mounting hole 26 of the mounting portion 22, the flange edge 45 is locked in a front face (an upper side in the drawings) of the mounting portion 22, and a base end portion of the boss 44 is disposed inside the mounting hole 26, the disc portion 41 is housed in the housing portion 22c, and the vibration-proof member 40 is mounted in the mounting portion 22.

The clip 30 is a resin molded article made of a synthetic resin material, and is integrally formed by the cylindrical neck portion 31; the pair of fixation ribs 32 provided in an end of the neck portion 31; a pair of elastic claws 33 provided on an outer peripheral face of a side portion of the neck portion 31; the circular collar portion 34 provided in a base end of the neck portion 31; and a locking portion 36 formed on the other side of the collar portion 34.

The neck portion 31 is formed in a cylinder shape around the shaft center C1, and is provided to stand from a center portion of an upper face of the collar portion 34. In the end of the neck portion 31, there is provided the pair of fixation ribs 32 protruding outward from a side face.

The pair of fixation ribs 32 is provided to project outward from an outer periphery of the neck portion 31 in an end portion of the neck portion 31, and is disposed with a phase difference of 180 degrees to face each other. The pair of fixation ribs 32 can be inserted through the concave grooves 43b. The end of the neck portion 31 has an outline shape along an inside shape of the long hole 43, and is formed to be insertable through the long hole 43.

The pair of elastic claws 33 is provided on the outer peripheral face of the neck portion 31, and is provided to project outward. The pair of elastic claws 33 is disposed with a phase difference of 180 degrees to face each other. The pair of elastic claws 33 is disposed with a phase difference of 90 degrees respectively with the fixation ribs 32. The elastic claw 33 includes an inclination face 33a expanding outward toward a base end side of the clip 30. Around the pair of elastic claws 33, there are respectively formed notch portions 35. Each notch portion 35 is formed in a C shape in which a slit formed along a shaft direction at both sides of the elastic claw 33, and a slit formed in one end side (a clip base end side) of the elastic claw 33 continue. When the clip 30 is inserted into the long hole 43, in the elastic claw 33, the inclination face 33a interferes with an inner face of the fitting hole 43a so as to be pressed, so that as a supporting point of a terminal on an end side of the clip 30, the elastic claw 33 can elastically bend to be deformed inward in a radial direction.

A length from the center C1 of the neck portion 31 in a free state (a restored state) to an outer end of the elastic claw 33 is formed to be longer than a diameter of the fitting hole 43a, and to be shorter than a distance from the center C1 of the long hole 43 to an inner wall of the concave groove 43b. There, in the free state, an outer diameter of the elastic claw and an inner diameter of the concave groove 43b have approximately the same diameter. Consequently, the elastic claw 33 restored to an original state inside the concave groove 43b is locked in the inner wall of the concave groove 43b so as to be positioned, and a relative rotation between the clip 30 and the vibration-proof member 40 is prevented.

The collar portion 34 (a first flange portion) has a disc shape around the shaft center C1, and has an outer diameter size slightly smaller than an inner diameter size of the skirt portion 42. A thickness of the collar portion 34 is thinner than a length of the skirt portion 42. In the assembly state, the collar portion 34 is housed inside the concave portion 40a on the rear side of the vibration-proof member 40, and is covered by the disc portion 41 and the skirt portion 42.

The locking portion 36 includes a pair of ribs 37 provided to stand from a rear face of the collar portion 34; an attachment plate 38 crossing between the pair of ribs 37; a screw hole 38a formed in the center of the attachment plate 38; and a plurality of pressing pieces 39 surrounding the screw hole 38a. In the screw hole 38a, the locking portion 36 is locked in the body panel 18 of a vehicle body by an attachment member such as a stud bolt 19 and the like, and the clip 30 is fixed to the attachment object.

Next, an assembly procedure of the clamp 10 according to the present embodiment will be explained with reference to FIG. 2 to FIG. 4-2. First, as the first process, the vibration-proof member 40 is mounted in the mounting portion 22 of the clamp main body 20. At that time, by conforming to the shape of the mounting hole 26 of the mounting portion 22, the flange edge 45 of the vibration-proof member 40 is positioned, and the flange edge 45 is pressed into the mounting hole 26 so as to insert the boss 44 into the mounting hole 26. The vibration-proof member 40 is deformably formed by the rubber material, and the outer peripheral edge 45*a* of the end of the flange edge 45 is formed in the tapered shape, so that the flange edge 45 interferes with the mounting hole 26, and is elastically deformed while being deformed inward, and the flange edge 45 is inserted and passed through the mounting hole 26.

After the flange edge 45 passes through the mounting hole 26, the vibration-proof member 40 restores to an original state, and the flange edge 45 is locked in a front face side of the mounting portion 22. Also, the boss 44 is internally fitted in the mounting hole 26, and the disc portion 41 is housed inside the housing portion 22*c* on the rear side of the mounting portion 22, so that the vibration-proof member 40 is mounted in the mounting portion 22.

Next, as a second process, the neck portion 31 of the clip 30 is inserted into the long hole 43 of the vibration-proof member 40 mounted in the clamp main body 20 in a shaft direction. At that time, by conforming to the shape of the long hole 43, the pair of fixation ribs 32 of the clip 30 is positioned in such a way as to correspond to the concave groove 43*b*, and when the neck portion 31 is inserted into the fitting hole 43*a*, the elastic claw 33 interferes with an inner wall of the fitting hole 43*a*, and while being elastically deformed in such a way as to retract inward in a radial direction, the clip 30 is inserted into the long hole 43.

Then, when the clip 30 relatively moves in the shaft direction and reaches a predetermined position, the fixation rib 32 passes through the concave groove 43*b*, and slips out to a front side. At that time, the collar portion 34 of the clip 30 is housed inside the concave portion 40*a* on the rear side of the vibration-proof member 40. The elastic claw 33 is in a state of being elastically deformed inward inside the fitting hole 43*a*.

From this state, as a third process, the clip 30 is relatively rotated for 90 degrees around the shaft center C1 relative to the vibration-proof member 40. The fixation rib 32 moves 90 degrees in a circumferential direction and deviates, and the elastic claw 33 moves 90 degrees in the circumferential direction. Then, at the point of rotating the clip 30 for 90 degrees, when the elastic claw 33 reaches a position corresponding to the concave groove 43*b*, the pair of elastic claws 33 restores to the original state outward so as to open, and is fitted in the concave groove 43*b*. At the same time, the fixation rib 32 is locked in the flange edge 45 around the fitting hole 43*a*. With that, an assembly movement is completed, and the clamp main body 20 and the clip 30 are fixed by interposing the vibration-proof member 40. Incidentally, since the collar portion 34 and the disk portion 41 include arc-like outer edges having the same shaft, at a fixation time, the vibration-proof member 40 and the clip 30 are structured to be easily turned relatively.

In the assembly state, the disc portion 41 is disposed in the housing portion 22*c* of the mounting portion 22, and the flange edge 45 protrudes from the mounting hole 26 and is locked around the mounting hole 26. Also, the collar portion 34 is disposed in the concave portion 40*a*, and the elastic claw 33 is disposed in the concave groove 43*b*. Also, the fixation rib 32 is locked around the mounting hole 26 in the mounting portion 22, and the flange edge 45 is clamped between the fixation rib 32 and the collar portion 34. Namely, the fixation rib 32 of the clip 30 and the clamp main body 20 clamp the vibration-proof member 40 to be fixed. The pipe 12 is clamped in the holding portion 21 of the clamp 10, and the locking portion 36 is fixed to the body panel 18 which is the attachment object, so that the pipe material can be attached to the attachment object.

According to the clamp 10 with respect to the present embodiment, due to a structure in which the fixation rib 32 and the elastic claw 33 are provided in the clip 30, simplification of an assembly operation and an improvement of a fixation ability in the assembly state can be attained.

Namely, by a simple assembly movement only by inserting the clip 30 into the long hole 43 and rotating, at an insertion time, the elastic claw 33 is bent and deformed so as to prevent damage of the clip 30. Also, only by rotating the clip 30 after passing through the fixation rib 32, the elastic claw 33 is positioned inside the concave groove 43*b* so as to prevent a rotation. At the same time, the fixation rib 32 is locked in the flange edge 45 around the fitting hole 43*a* so as to prevent slipping out.

At the fixation time, the vibration-proof member 40 is clamped by the fixation rib 32 of the clip 30 and the mounting portion 22 of the clamp main body 20 so as to improve the fixation ability in the shaft direction. Also, the vibration-proof member 40 is interposed so as to absorb a vibration, so that the vibration of a vehicle can be prevented from being transmitted to the pipe 12 and a vibration-proof effect can be attained. Furthermore, a circumference of the disc portion 41 has a structure of being surrounded by the mounting portion 22 of the clamp main body 20 so as to prevent wobbling in a rotation direction.

Furthermore, when the clip 30 is rotated, at the point when the elastic claw 33 enters into the concave groove 43*b*, torque rapidly diminishes, so that an operator can receive a moderate feeling at an attachment time of the clip 30, and can surely judge that the elastic claw 33 is disposed in a predetermined position. Since the outer diameter of the elastic claw 33 and the inner diameter of the concave groove 43*b* have approximately the same diameter, the elastic claw 33 and the vibration-proof member 40 are fitted so as to be reliably and accurately locked.

Also, since an outer diameter of the boss 44 of the vibration-proof member 40 and an inner shape of the mounting hole 26 of the clamp main body 20 have approximately the same diameter, wobbling in the rotation direction can be prevented. The collar portion 34 and the concave portion 40*a* are formed concentrically, and the outer edge of the collar portion 34 is formed along an inner shape of the skirt portion 42, so that a relative rotation movement is guided so as to facilitate an operation.

Incidentally, the present invention is not limited to the embodiment described hereinabove, and can be variously modified provided that it does not exceed the subject of the present invention. Also, a specific structure, a material, or the like of each portion is not limited to the illustrated ones in the embodiment described hereinabove, and can be arbitrarily modified.

Although the clamp main body 20 is disposed on an upper side in the drawings, and the clip 30 is disposed on a lower side in the drawings for the sake of explanation, positions of the clamp main body 20 and the clip 30 may be turned upside down, or the clamp 10 may be used in an overturned state.

Furthermore, even if one part of the structural requirements of the embodiment described hereinabove is omitted, the present invention can be attained.

Incidentally, all contents of the specification, claims, drawings, and abstract of Japanese Patent Application No. 2011-237735 filed on Oct. 28, 2011 are cited in their entireties herein and are incorporated as a disclosure of the specification of the present invention.

What is claimed is:

1. A vibration-proof clamp, comprising:
a clamp main body provided with a holding portion by which a pipe material is adapted to be held, and having a mounting hole formed therein;
a vibration-proof member mounted in the mounting hole, and having therein a fitting hole with a hole shaft aligning with the mounting hole, and a concave groove provided by notching a peripheral edge of the fitting hole; and
a clip including a cylindrical neck portion inserted into the fitting hole, a fixation rib inserted through the concave groove, and an elastic claw projected on an outer peripheral face of the neck portion and formed to be retractable inward in a radial direction,
wherein after the neck portion is inserted into the fitting hole, the elastic claw retracts in the radial direction and the fixation rib passes through the concave groove, the clip is relatively rotated relative to the vibration-proof member, so that the elastic claw fits into the concave groove.

2. A vibration-proof clamp according to claim 1, wherein the elastic claw is defined by a slit along a center shaft line of the clip, and is retractable inward in a radial direction as a supporting point on a clip end side of the slit; and in a state in which the elastic claw is fitted into the concave groove of the vibration-proof member, the fixation rib of the clip and the clamp main body clamp and fix the vibration-proof member.

3. A vibration-proof clamp according to claim 1, wherein the elastic claw and the fixation rib are respectively provided in opposed positions of a circumference of the clip having a cylinder shape, and the elastic claw and the fixation rib are disposed at intervals of approximately 90 degrees in a circumferential direction.

4. A vibration-proof clamp according to claim 1, wherein the concave groove has a diameter approximately same as that of the elastic claw in a free state.

5. A vibration-proof clamp according to claim 1, wherein an outer edge of the vibration-proof member and an inner edge of the mounting hole of the clamp main body have approximately same diameter.

6. A vibration-proof clamp according to claim 1, wherein the clip is provided with a first flange portion including an arc-like outer edge, and
the vibration-proof member is provided with a second flange portion including an arc-like outer edge coaxial with the first flange portion.

* * * * *